| United States Patent [19] | [11] | 4,424,347 |
|---|---|---|
| Rähse et al. | [45] | Jan. 3, 1984 |

[54] MODIFIED HYDROXYALKYL CELLULOSES AND METHOD OF PREPARATION

[75] Inventors: Wilfried Rähse, Düsseldorf; Norbert Kühne, Haan; Willi Wüst, Ratingen-Hösel, all of Fed. Rep. of Germany

[73] Assignee: Henkel Kommanditgesellschaft auf Aktien, Dusseldorf-Holthausen, Fed. Rep. of Germany

[21] Appl. No.: 387,178

[22] Filed: Jun. 10, 1982

[30] Foreign Application Priority Data

Dec. 28, 1981 [DE] Fed. Rep. of Germany ....... 3151681

[51] Int. Cl.$^3$ .................. B01F 17/56; C08B 11/08; C08B 11/193; E21B 43/22
[52] U.S. Cl. ................... 536/91; 252/8.5 C; 252/8.5 LC; 536/88
[58] Field of Search .................. 536/88, 91, 95, 96; 252/8.5 C, 8.5 LC

[56] References Cited

U.S. PATENT DOCUMENTS

| 3,378,070 | 4/1968 | Wessler et al. | 536/96 |
|---|---|---|---|
| 3,388,082 | 6/1968 | Rodgers et al. | 524/560 |
| 3,446,795 | 5/1969 | Boudreaux et al. | 536/91 |
| 3,448,100 | 6/1969 | Callihan et al. | 536/91 |
| 3,709,876 | 1/1973 | Glomski et al. | 536/91 |
| 3,839,319 | 10/1974 | Greminger et al. | 536/91 |
| 4,084,060 | 4/1978 | Glass et al. | 536/88 |
| 4,239,629 | 12/1980 | Sauber | 252/8.5 C |

FOREIGN PATENT DOCUMENTS 50-38782  4/1975  Japan ..................... 536/91

Primary Examiner—Ronald W. Griffin
Attorney, Agent, or Firm—Hammond & Littell, Weissenberger and Muserlian

[57] ABSTRACT

A method for preparing modified hydroxyalkyl celluloses, particularly hydroxyethyl cellulose which involves adding to the reaction mixture by which hydroxyalkyl celluloses are prepared, a minor amount, in the range of 0.005 to 0.8 mols of methyl chloride or monochloroacetic acid which are additional etherification agents per mol of anydroglucose units.

3 Claims, No Drawings

MODIFIED HYDROXYALKYL CELLULOSES AND METHOD OF PREPARATION

BACKGROUND OF THE INVENTION

Hydroxyalkyl celluloses are well known commercial products which are produced on a large scale. These materials have many uses such as in coating, film forming and in cosmetic preparations. A particular use which consumes large quantities of hydroxyalkyl celluloses is in various aspects of petroleum production especially in compounding drilling mud compositions which are used as flushing aids when an oil well is drilled.

The usefulness of hydroxyalkyl celluloses as components of drilling muds and other compositions useful in crude oil production is well known. One of the characteristics of these compounds is their ability to increase the viscosity of water and of aqueous mixtures which provides a means for suspending relatively dense compositions needed to float the debris or in the drilling of a well to the surface. The components of the drilling mud must retain their properties even when subjected to the considerable shear forces and temperatures at the point of drilling. A further need for maintaining relatively high viscosity in drilling mud compositions is the reduction in loss of volume of the mud due to porosity of the newly drilled well walls.

A problem often arises when using hydroxyalkyl celluloses which directly affects their usefulness for oil production uses, particularly as components of drilling muds. Hydroxyalkyl celluloses usually are readily dissolved in water. The problem which usually occurs is that in solutions where the viscosity is the result of the presence of hydroxyalkyl celluloses, the viscosity steadily diminishes, often within short periods of time. The causes of viscosity loss is not fully understood but it is assumed generally to be due to biological action such as that which is associated with enzymes, bacteria or fungi.

Conventionally prepared hydroxyethyl celluloses were prepared as 2% aqueous solutions and their Brookfield viscosities measured at intervals. For two different batches the initial viscosities were:

|  | A | B |
| --- | --- | --- |
|  | 19500 mPa.s | 5000 mPa.s |
| On the eight day | 11000 mPa.s | 1300 mPa.s |

A third C initially had a viscosity of 26500 mPa.s. This solution was kept in a closed vessel and retested at the fourth week. Its viscosity measured 100 mPa.s and at the eighth week the viscosity was down to 15 mPa.s.

OBJECTS OF THE INVENTION

It is an object of the present invention to provide hydroxyalkyl celluloses which have been modified to prevent or significantly diminish any tendency of hydroxyalkyl cellulose solutions to suffer reduction in viscosity.

Another object of the present invention is to provide a method for producing a modified hydroxyalkyl cellulose showing significant improvement in its storage stability particularly with respect to viscosity.

It is another object of the present invention to provide a component for use in preparing drilling muds and other compositions used in oil production which has improved stability with respect to viscosity.

It is a further object of the present invention to provide a method for the production of modified hydroxyalkyl celluloses, particularly hydroxyethyl cellulose, which form solutions having improved viscosity stability by reacting a cellulose material with alkylene oxides, particularly ethylene oxide, in the presence of basic compounds, particularly an alkali methyl hydroxide, which includes adding to the reaction another etherification agent in an amount of about 0.005 to 0.8 mols, such as methyl chloride or monochloracetic acid, per mol of anhydroglucose units.

These and other objects of the invention will become more apparent as the description thereof proceeds.

DESCRIPTION OF THE INVENTION

The present invention is the result of the discovery that the addition of minor amounts of a further etherification agent such as methyl chloride or monochloracetic acid to the reaction mixture for the production of hydroxyalkyl celluloses results in a product which is to an unexpected extent viscosity stable in solution.

The amounts of the modifying etherification agent are so small that it would be improper to speak of mixed etherification in any real sense. The products obtained are still substantially hydroxyalkyl celluloses although containing a minor number of methoxy or carboxy methoxy groups. Following the teaching of the present invention a hydroxylalkyl cellulose is obtained which had about one methoxy or one carboxymethyl group per every three to about fifty anhydroglucose units. The manner in which the stabilization of viscosity is obtained in solutions made with the products of the invention is not understood.

The present invention starts with the conventional method for the preparation of hydroxyalkyl celluloses. A cellulose starting material is reacted with alkylene oxides in a basic operating condition. The preferred reactants are ethylene oxide and an alkali metal hydroxide, particularly sodium hydroxide. Conventional methods are described in U.S. Pat. No. 3,287,353 and DE-OS No. 29-24-330 which are made part of the present disclosure.

The products of the invention may be produced by adding to the conventional reactants small quantities of other etherification agents such as methyl chloride or monochloroacetic acid. The etherification agents are added in amounts of from about 0.005 to about 0.8 mols per mol of anhydroglucose units. The corresponding fraction of these etherification agents are bound to cellulose at the usual selectivities from 30 to 70%. For example, at a selectivity of 50%, one half of the hydroxyl group-free etherification agents are bound to the cellulose. Preferably these hydroxyl group-free etherification agents are employed in amounts of from 0.02 to 0.2 mols per mol of anhydrogluclose units.

In the products produced according to the invention a much higher viscosity stabilization in aqueous solution is observable. Thus, for example, no decrease in the viscosity of aqueous solutions takes place in the products produced according to the invention within 8 days. After 4 weeks the viscosity decrease is in the range between 0 and 20%. This means that in many cases a viscosity degradation within this range is not detectable by measurement.

These differences in the measured values between conventional hydroxyethyl cellulose solutions and the solutions obtained with the products produced according to the invention are remarkable. A scientific explanation for this stabilizing effect of the small quantities of methoxy or carboxymethyl groups in the hydroxyalkyl cellulose ether cannot be given. It is striking and advantageous furthermore that the solutions of the hydroxalkyl celluloses produced according to the invention have an improved surface structure. This surface structure no longer has the previously known gel-like character; instead the solutions flow off "smoothly". The unexpected stabilizing influence of the small additions according to the invention in the transformation of cellulose to hydroxyalkyl celluloses occurs independently of the chosen production mode of the hydroxyalkyl celluloses. Hence, for example, it makes no difference whether the reaction proceeds continuously or intermittently and whether the cellulose is subjected to strong shear or other activation. Likewise of no effect is the type of the cellulose and particle size of the employed cellulose. All known grades of cellulose and degrees of fineness can be reacted according to the method of the invention.

The only difference between the conventional hydroxyalkyl celluloses and those modified in accordance with the present invention is the extremely small numbers of methoxy or carboxymethoxy moieties added to the conventional product. The results are the same improvement whether the reaction is carried on in batch or continuous processes.

A preferred method and product thereof of the present invention conforms to the following requirements. The modified hydroxyalkyl celluloses have a hydroxyalkyl substitution degree (hydroxyalkyl MS) in the range of from about 1.5 to about 4.0. The modifying moiety supplied by the reaction with the further etherification agent is a carboxymethoxy MS and/or methoxy MS in a range from about 0.003 to about 0.7 and preferably in a range from about 0.02 to about 0.2.

Products produced in accordance with the present have been found to be useful in many applications. The long storage or shelf-life with retained viscosity makes for less trouble in oil field uses as well as their resistance to loss of other desirable characteristics when exposed to abnormal heat or shear.

The following example is provided by way of illustration and not by way of limitation. It is not to be construed as limiting the invention thereto.

EXAMPLE

Fir cellulose having a moisture content of about 4% was supplied as fibers having maximum length of 1 mm.

70 kg cellulose was suspended in 1020 kg of 87% isopropanol and water. The suspension was degassed by applying a vacuum of about 150 Torr. To the degassed suspension was then added at a temperature of about 18° C., 36.5 kg of a 50% sodium hydroxide solution over a period of five minutes. The solution having a temperature of 40° to 45° C. now had added to it 80.3 kg of ethylene oxide and 2.09 kg of methyl chloride. The reaction took place for one hour at 50° C. followed by heating for a second hour while maintaining the temperature at 80° C. The product was washed with an alcohol-water mixture.

The washed product was made up as a 2% aqueous solution assuming the modified hydroxyethyl cellulose to have a 5% moisture content. Viscosity was measured using a Brookfield viscometer at 20.0° C. Turbidity number was determined in a device available from the firm of Lange, Berlin.

The product had a viscosity of 21,500 mPa.s and a turbidity of 9%. The hydroxyethyl MS of this product was determined to be about 2.2 and the methoxy MS to be about 0.05.

After storage of the solution for 4 weeks in a closed vessel at room temperature, the viscosity was determined again. It was 21,800 mPa.s, that is an identical value within the limit of error of the measurement.

The preceding embodiment is illustrative of the practice of the present invention. It is to be understood, however, that variations which may be obvious to those skilled in the art or suggested herein, may be employed without departing from the spirit of the invention or the scope of the appended claims.

We claim:

1. A method for the production of a modified hydroxyethyl cellulose having improved viscosity stability comprising reacting a cellulose material with ethylene oxide in a basic medium, said ethylene oxide being employed in a sufficient amount so that the resultant product has a hydroxyethyl MS in the range of 1.5 to 4.0, in which there is also present in the reaction mixture an amount sufficient so that the resultant product has an ether MS selected from the group consisting of a carboxymethoxy MS and a methoxy MS in the range of 0.02 to 0.2 of an additional etherification agent selected from the group consisting of methyl chloride and monochloroacetic acid, and recovering a modified hydroxyalkyl cellulose having a hydroxyethyl MS in the range of 1.5 to 4.0 and a carboxymethoxy MS and/or a methoxy MS in the range of 0.02 to 0.2.

2. A method as set forth in claim 1 wherein the basic medium is made so by use of an alkali metal hydroxide.

3. A method as set forth in claim 2 wherein the alkali metal hydroxide is sodium hydroxide.

* * * * *

UNITED STATES PATENT AND TRADEMARK OFFICE
CERTIFICATE OF CORRECTION

PATENT NO. : 4,424,347
DATED : January 3, 1984
INVENTOR(S) : WILFRIED RÄHSE et al.

It is certified that error appears in the above-identified patent and that said Letters Patent are hereby corrected as shown below:

Column 1, line 21, "debris or" should read -- debris formed --.

Signed and Sealed this

Twenty-fourth Day of July 1984

[SEAL]

Attest:

GERALD J. MOSSINGHOFF

Attesting Officer        Commissioner of Patents and Trademarks